United States Patent [19]

Still et al.

[11] Patent Number: 4,887,501
[45] Date of Patent: Dec. 19, 1989

[54] STABILIZER PLY TRIMMER

[75] Inventors: Donald O. Still, Akron; George J. Burley, Clinton, both of Ohio

[73] Assignee: Bridgestone/Firestone, Inc., Akron, Ohio

[21] Appl. No.: 452,851

[22] Filed: Dec. 23, 1982

[51] Int. Cl.⁴ ............................................. B23B 5/14
[52] U.S. Cl. ........................................ 82/54; 82/100; 83/187
[58] Field of Search .......... 83/187, 496, 497, 111–113; 82/54, 58, 71, 75, 92, 93, 100, 101, 52

[56] References Cited

U.S. PATENT DOCUMENTS

| 1,756,171 | 4/1930 | Bommer | 83/505 |
| 2,234,330 | 3/1941 | Zetzsche | 83/155 |
| 3,398,615 | 8/1968 | Grabill | 83/187 |
| 3,459,086 | 8/1969 | Reeder | 83/496 |
| 3,460,419 | 8/1969 | Branick | 83/187 |
| 3,485,128 | 12/1969 | Siegenthaler | 83/326 |
| 3,701,296 | 10/1972 | Snow | 82/58 |
| 3,733,941 | 5/1973 | Geyer | 82/101 |
| 3,791,243 | 2/1974 | Holinski | 83/925 EB |
| 3,884,422 | 5/1975 | Weichel | 83/112 |
| 4,238,980 | 12/1980 | Frame | 82/54 |
| 4,267,754 | 5/1981 | Allaman | 83/187 |

Primary Examiner—Hien H. Phan
Attorney, Agent, or Firm—Ronald Brietkrenz

[57] ABSTRACT

A trimming apparatus and method which may be used in conjunction with an automated tire assembly system which automatically trims the edges of the stabilizer ply member. The apparatus uses a rotary cutter angled with respect to the axis of the stabilizer ply member in order to produce a uniform cut.

1 Claim, 5 Drawing Sheets

STABILIZER PLY TRIMMER

BACKGROUND OF THE INVENTION

1. Field of the Invention

This invention relates to the fabrication of stabilizer ply members in the construction of a tire and more particularly to the means and method for trimming the stabilizer plies in order to produce a highly uniform stabilizer ply construction which results in a high degree of durability which provides for an improved tire. Specifically, the instant invention relates to a trimming means and method used in conjunction with an automated tire assembly system which automatically trims the edges of the stabilizer ply member. The instant invention employs a rotary cutter angled with respect to the axis of the stabilizer ply member in order to produce a uniform cut and which is adapted to be used in conjunction with automated tire assembly equipment.

2. Description of the Prior Art

Means for the trimming of stabilizer ply members are old in the art and include means employing rotary trimmers. Conventionally, rotary trimmers are used in connection with a manual tire assembly machine in order to trim the stabilizer ply members after they have been manually applied to the building drum of the tire assembly machine. In a typical arrangement the stabilizer ply trimmers are located below the building drum and are mounted in order to be movable along the axis of the tire building drum. When it is desired to trim the stabilizer ply members, the trimmer means are moved in order to cause one of the rotary trimmers to engage one of the edges of the stabilizer ply member. When the cut of the first edge of the stabilizer ply member has been completed, and the rotational direction of the drum is reversed, the trimmer means is caused to engage a second rotary trimmer with the opposite edge of the stabilizer ply member in order to cause the trimming of that edge of the stabilizer ply member. In both instances the plane of the rotary cutter of the stabilizer ply trimmer is orthogonal to the axis of the building drum of the tire assembly machine.

One of the problems encountered in the prior art is an irregularity produced in the edge of the trimmed stabilizer ply member caused by the failure of the rotary trimmer to correctly cut the stabilizer ply member during the time it is caused to engage the edge of the stabilizer ply member. Due to the flexible nature of the edge of the stabilizer ply member, during the initial plunge of the rotary trimmer into the stabilizer material, the stabilizer ply material is slightly deflected thereby preventing the rotary trimmer from properly cutting the stabilizer ply material. This results in a slight hump at the position where the rotary trimmer is introduced into the stabilizer ply member.

A second problem encountered with the prior art concerns the minimum width of cut that must be taken in order to produce an acceptable cut by the rotary trimmer. It has been experienced that it is necessary to cut at least 3/16 inch (4.7 mm) of stock from the edge of the stabilizer ply member in order to produce an acceptable quality of cut and thereby produce a desired uniform edge of the stabilizer ply member. It has been found that any attempts to produce a cut of lesser width results in an irregular cutting action of the rotary trimmer and hence an irregular edge of the stabilizer ply member. The requirement for cutting a relatively large portion from the stabilizer ply means results in a substantial amount of stabilizer ply stock being discarded as scrap with the subsequent increase in costs in the manufacture of the stabilizer ply means.

A third problem associated with the prior art means of trimming the stabilizer ply means concerns the removal of the cut salvage from the stabilizer ply member. Due to the tacky nature of the stabilizer ply material, there is a tendency for the cut salvage of the stabilizer ply material to re-attach itself to the edge from which it was cut after passing by the knife of the rotary cutter. In the conventional situation where the rotary trimmers are utilized in conjunction with a manual tire assembly machine, the re-attachment of the cut salvage to the stabilizer ply member is eliminated by having the operator manually pull the cut salvage from the stabilizer ply member after it has been cut by the rotary trimmer. This means for salvage removal is totally unsuitable for use in connection with an automated tire assembly system.

There is, therefore, a need for an apparatus which is readily adapted to trim the edges of a stabilizer ply member without deforming the edge thereof in order to produce a uniform cut and which may efficiently cut the edge of the stabilizer ply member with only a relatively small salvage and further having means for the removal of the salvage from the edge of the stabilizer ply member which facilitates use in conjunction with automated tire assembly equipment. The instant invention provides such a means allowing for the precise cutting of the edges of a stabilizer ply member wherein a relatively small salvage may be cut from the edge of the stabilizer ply assembly and the salvage is automatically removed from the edge of the stabilizer ply assembly.

SUMMARY OF THE INVENTION

The present invention relates to stabilizer ply assembly and more particularly to a means and method for the trimming of the edges of the stabilizer ply member wherein the edge produced by the trimming is uniform and requires a minimum amount of salvage to be trimmed from the stabilizer ply member. In addition, means are provided for automatically removing the salvage from the stabilizer ply member.

DESCRIPTION OF THE EXEMPLARY EMBODIMENT

Figure 1:
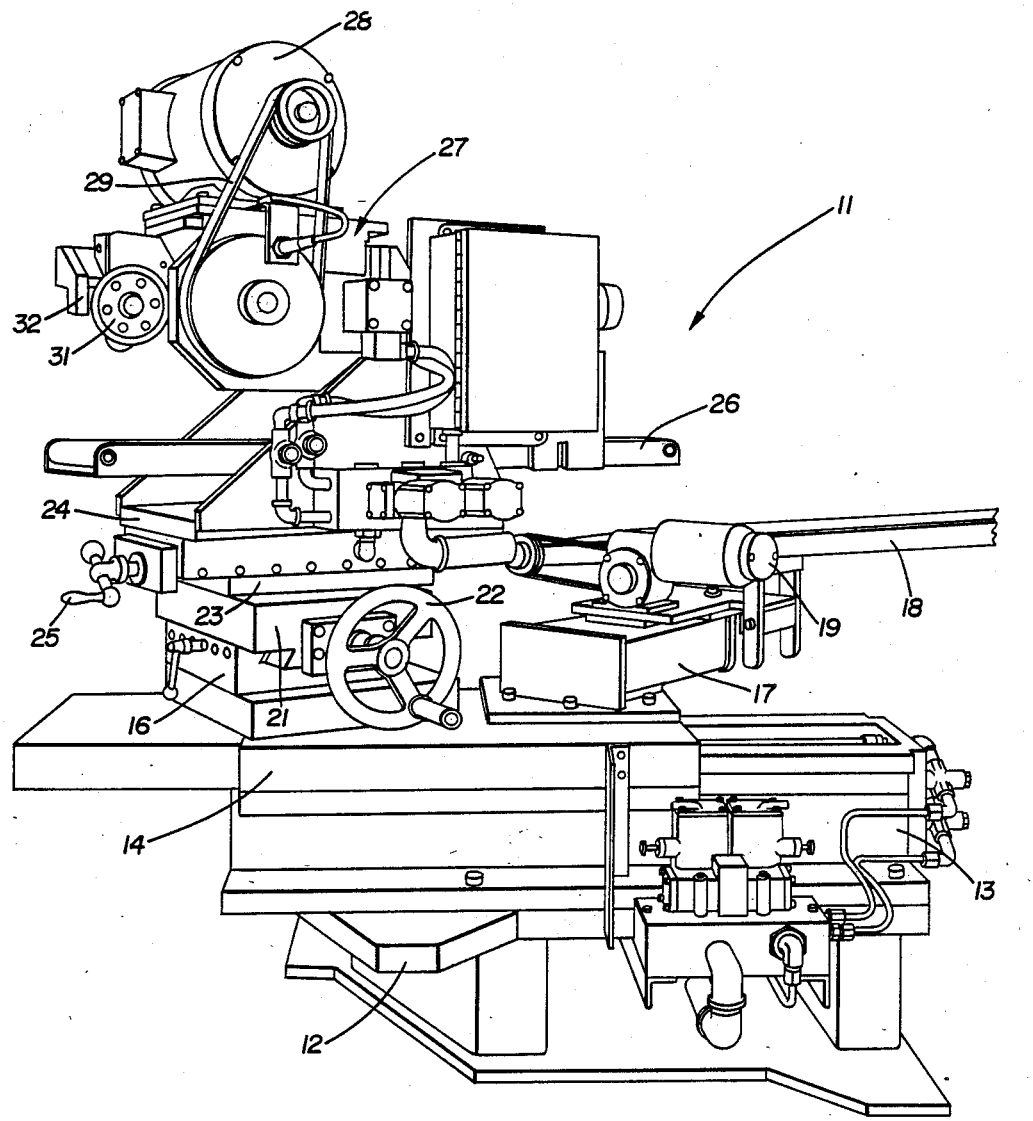
FIG. 1 is a front perspective view of the instant invention.
Figure 2:
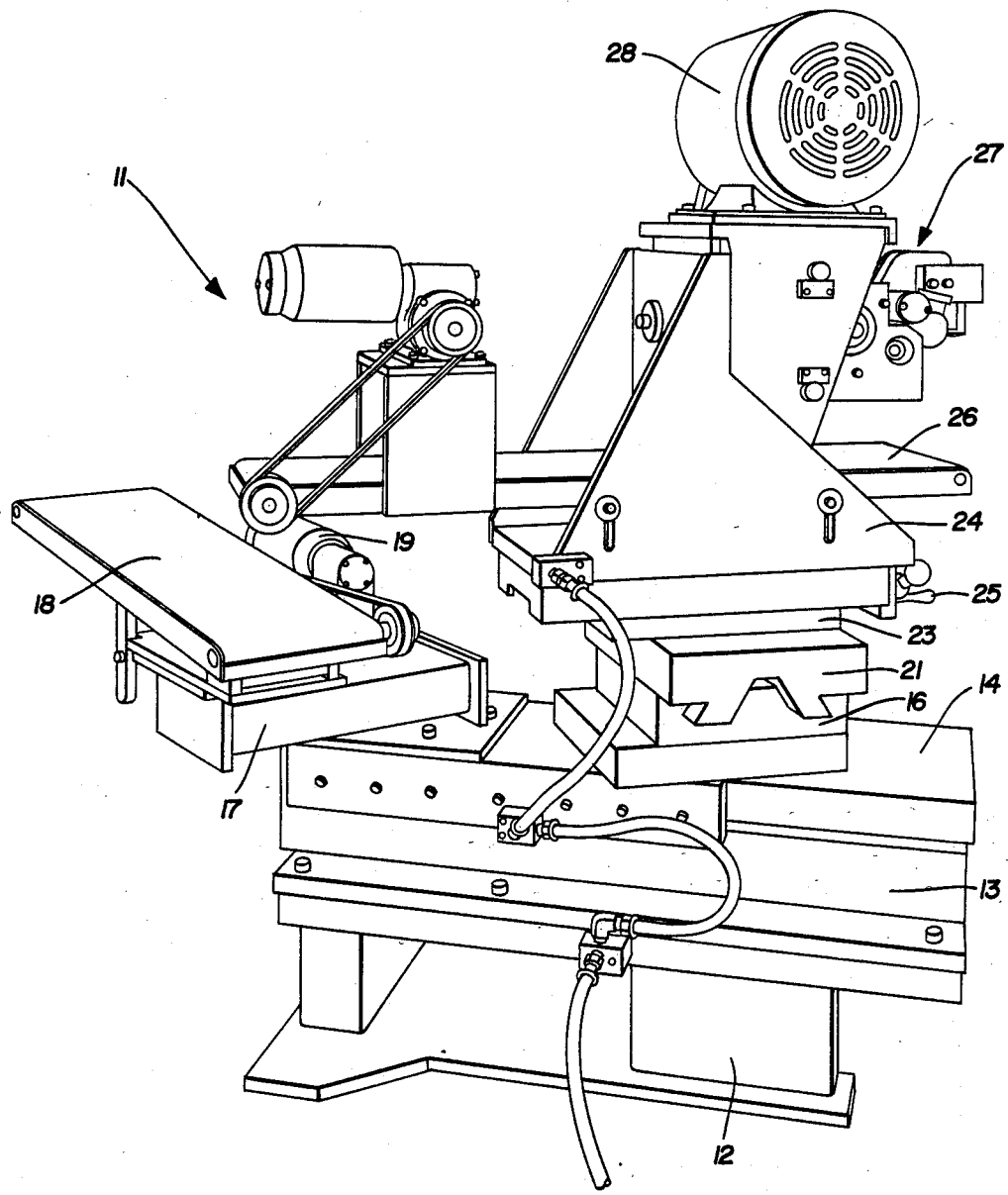
FIG. 2 is a rear perspective view of the instant invention.

Referring now to FIG. 1 of the drawings, there is disclosed the trimmer 11 of the instant invention which is comprised of a base 12 having thereon a slide 13 upon which is disposed main carriage 14 in order to facilitate the movement of main carriage 14 along the axis of the slide 13. In the exemplary embodiment the carriage 14 is displaced along slide 13 by means of a pneumatic cylinder contained within the slide 13.

Disposed on the main carriage 14 is secondary slide 16 and mounting base 17. Disposed on the mounting base 17 is salvage conveyor 18 which is driven by conveyor drive 19. The salvage conveyor 18 is employed to assist in the removal of the salvage from the edge of the tire stabilizer ply member as will be discussed in more detail below.

Engaged with the secondary slide 16 is secondary carriage 21 which may be caused to be displaced relative to the secondary slide 16 by means of hand wheel 22 which actuates a lead screw contained within the secondary slide 16 and which engages the secondary carriage 21 to cause movement thereof.

Fixedly attached to the secondary carriage 21 is a third slide means 23. The third slide means 23 has associated with it a third carriage means 24 which may be displaced relative to the third slide means along its longitudinal axis by means of hand wheel 25 which is engaged with a lead screw contained within the third slide means 23 and engaged with the third carriage means 24 in order to produce movement of the third carriage means 24 when the hand wheel 25 is rotated. Mounted upon the third carriage means 24 is upper salvage conveyor 26. It should be appreciated that the exit end of the upper salvage conveyor 26 is disposed over the entrance end of the salvage conveyor 18 in order that the conveyors 18 and 26 may be used to transport salvage material as discussed more fully below.

Mounted above the upper salvage conveyor 26 is rotary cutter assembly 27 which is driven by means of drive motor 28 via drive belt 29. The rotary cutter assembly 27 includes a rotary cutter 31 acting in conjunction with anvil 32 in order to produce a cutting action.

It may now be appreciated that there are provided means for accurate positioning of the rotary cutter assembly 27 by means of the slide/carriage units and there is further means for removing salvage cut by the rotary cutting element 31 and anvil 32 by means of the upper salvage conveyor 26 and salvage conveyor 18.

Figure 3:
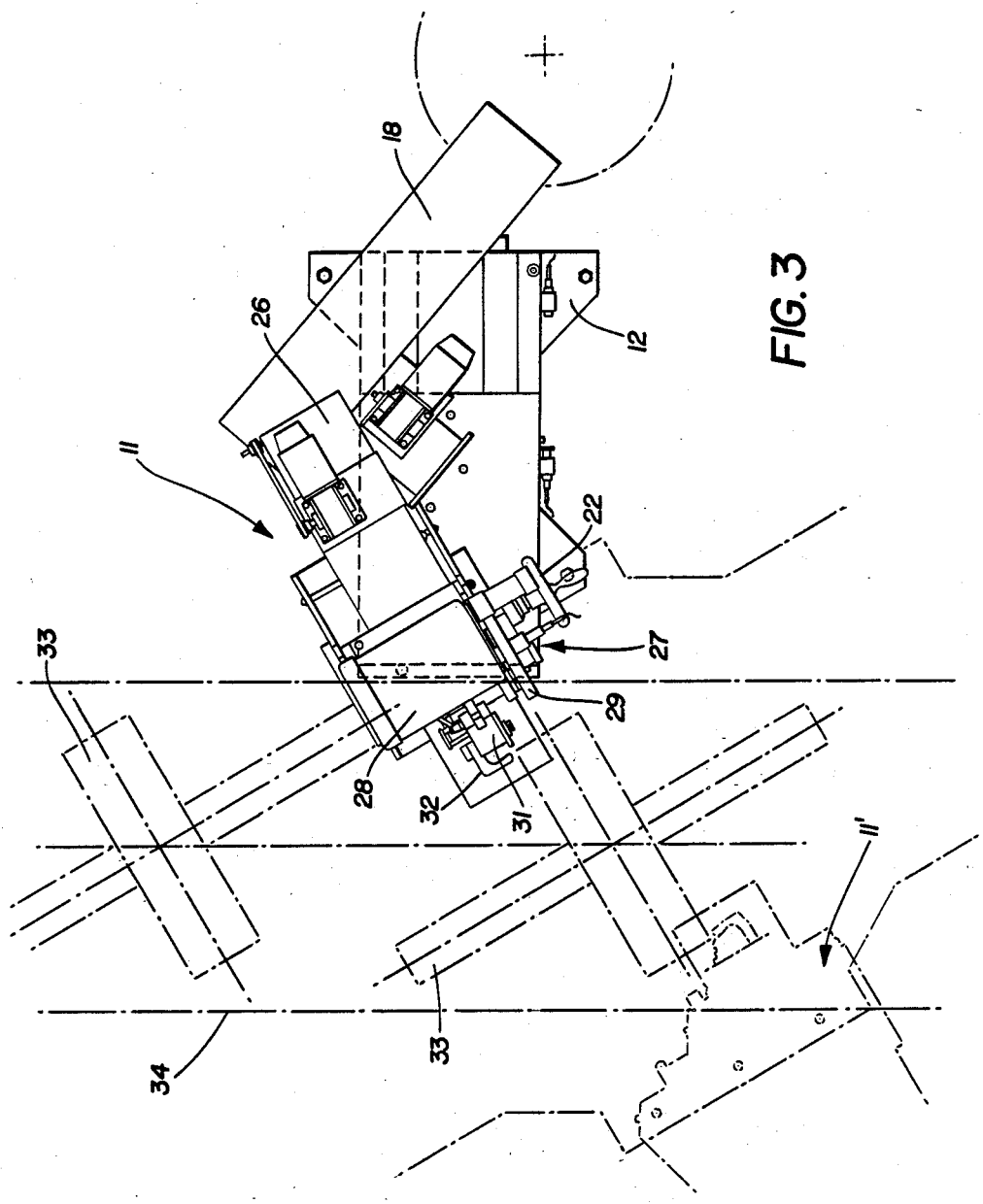
FIG. 3 is a plan view showing how the instant invention is employed.
Figure 5:
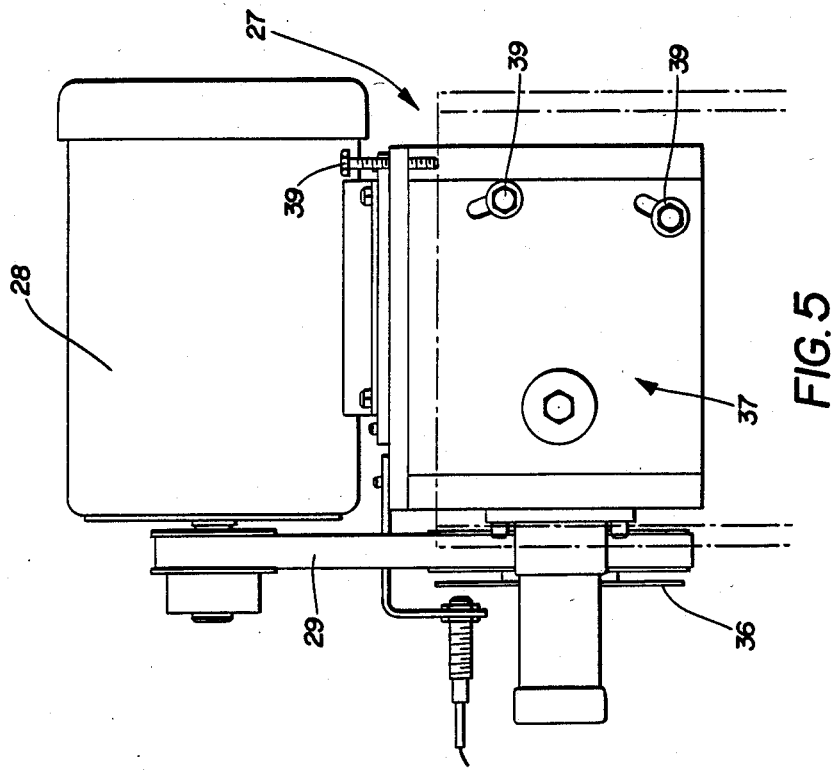
FIG. 5 is a rear view of the cutter assembly employed by the instant invention.

FIG. 3 of the drawings discloses a plan view of the instant invention employed in conjunction with an automated tire assembly system. Specifically, there are shown trimmers 11 and in phantom 11' which are adapted to trim the stabilizer ply member applied to building drums 33. In the exemplary embodiment the instant invention is designed to be used in conjunction with an automated tire assembly machine such as that disclosed in U.S. patent application Ser. No. 386,373 in the name of Loeffler, et al which patent application is specifically incorporated herein by reference. The automated tire assembly machine disclosed in the above noted patent application utilizes a conveyor system 34 to transport a plurality of tire building drums 33 to various work stations where one or more components are applied to the building drums or an operation is performed on the components already applied to the building drums 33. The building drums 33 are transported and maintained at an angular relationship with respect to the longitudinal axis of the conveyor system 34.

The instant invention is adapted to trim the edges of the stabilizer plies which have been previously applied to a building drum 33. A trimmer 11 is employed to trim each side of the stabilizer plies applied to the building drums 33. The trimmer 11' is a duplicate of the trimmer 11 and is positioned to trim the opposite side of the stabilizer plies as the trimmer 11.

In operation, the rotary cutter assembly 27 of the trimmer 11 is moved to a rearward position away from the conveyor system 34 by means of carriage 14 sliding along slide 13. When a tire building drum 33 has been chucked into the appropriate centers for the trimming station, the rotary cutter assembly 27 is moved towards the conveyor system 34 in order to position the rotary cutting element 31 proximate to the edge of the stabilizer ply member on the building drum 33. The rotary cutting element 31 is then caused to engage the edge of the stabilizer ply by causing the rotary cutting element and its associated anvil or fixed surface to be displaced along an axis parallel to the axis of the tire building drum during which time both the cutting element 31 and the tire building drum 33 are rotated in order to cause the edge of the stabilizer ply to be cut. The salvage piece cut from the end of the stabilizer ply is allowed to drop onto conveyor 26 which transports the salvage to conveyor 18 which in turn transports the salvage to a container for receiving said salvage.

It should be noted that the handwheels 22 and 25 and their respective carriages 21 and 23 may be employed to accurately position the rotary cutting element with respect to the tire building drum 33 in order to allow the trimmer 11 to trim the stabilizer plies of various sizes of tires.

After the rotary cutting element 31 has completed its cutting operation on the stabilizer ply, the rotary cutter assembly 27 is retracted back to its rearward position by means of carriage 14. The rotation of the drum is then reversed and the opposite trimmer is caused to trim the other edge of the stabilizer ply. The building drum 33 is then released by the centers associated with the trimming station and the tire building drum 33 is allowed to proceed to the next work station. The trimming work station is thus ready for receipt of another tire building drum having a stabilizer ply member needing trimming. In the exemplary embodiment, the drum rotates at a speed of approximately 90-95 surface feet per minute and the cutter rotates at approximately 1187 surface feet per minute in the same direction.

Figure 4:
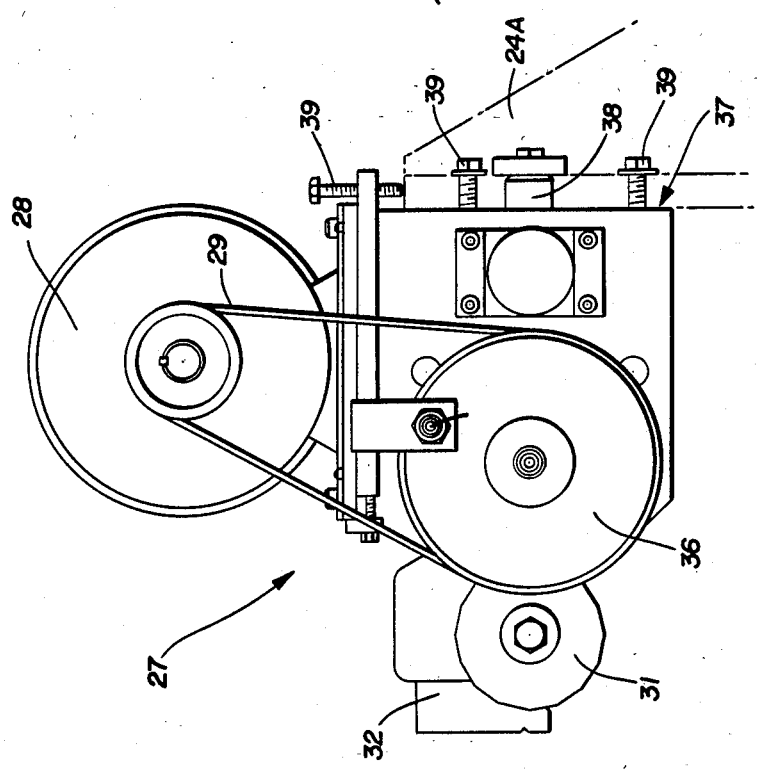
FIG. 4 is a side view of the cutter assembly employed by the instant invention.

Referring now to FIG. 4 of the drawings, there are shown further details of the rotary cutter assembly 27. The rotary cutter assembly 27 is comprised of a drive motor 28 driving drive belt 29 which in turn drives pulley 36 which provides drive to the cutter assembly transmission 37. The cutter assembly transmission in turn drives the rotary cutting element 31 as will be described in more detail below. The rotary action of the rotary cutting element 31 in conjunction with the anvil 32 causes the cutting action employed by the instant invention.

The details of construction of the rotary cutting element 31 and its associated anvil 32 are disclosed in U.S. Pat. No. 3,485,128 to Siegenthaler, which patent is hereby incorporated by reference herein.

It should be noted that the rotary cutter assembly 27 is rotatably mounted with respect to the third carriage means 24 by means of pivot mount 38 which allows the rotary cutter assembly 27 to rotate with respect to the support frame 24A which is mounted on the third carriage means 24. Adjustment bolt 39 threadingly engages rotary cutter assembly 27 and is biased against the support frame 24A to provide a means for adjusting the angular position of the rotary cutting assembly 27 with respect to the support frame 24A. Locking bolts 39, adapted to be movable within slots in the support frame 24A and threadedly engaging the rotary cutter assembly 27, allow the rotary cutter assembly 27 to be locked in a particular angular relationship with respect to the support frame 24A.

For reasons which will become apparent later, the axis of rotation of the rotary cutter assembly 27 about the pivot mount 38 is coincident with medial axis of the rotary cutting element 31 and its rotational centerline.

There is thus provided a means for providing a rotary movement of the rotary cutting element 31 via cutter assembly transmission 37, pulley 36 through belt 29 to drive motor 28. In addition, it should be appreciated that the rotary cutting element 31 may be rotated about its medial axis centerline.

Figure 6:
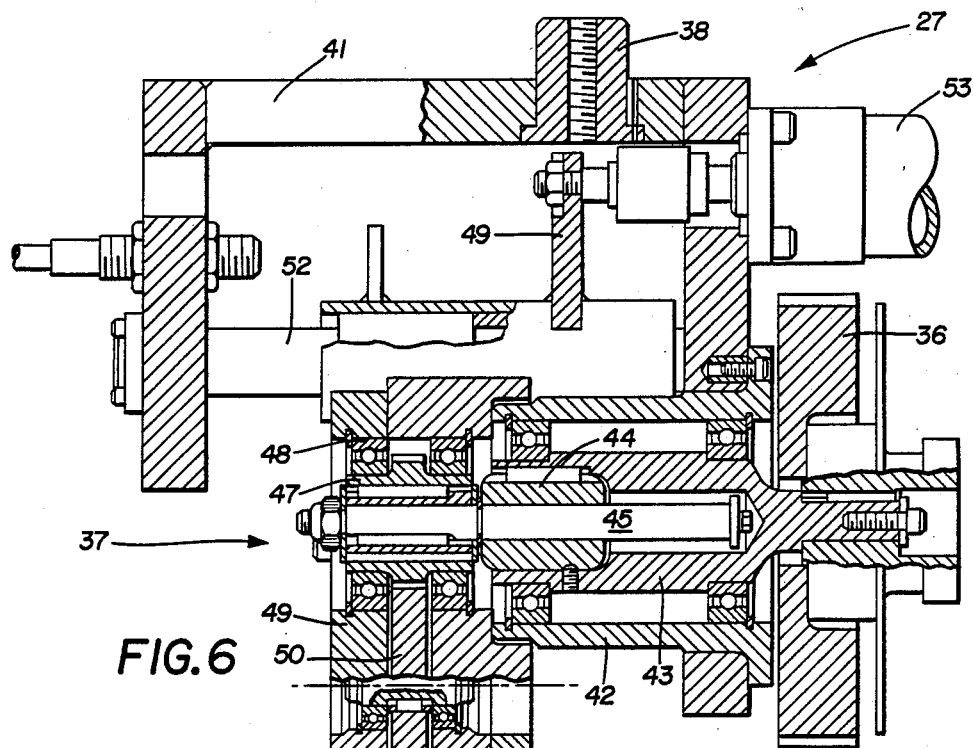
FIG. 6 is a plan cross section of the cutter assembly showing the details of construction of the cutter assembly.

FIG. 6 of the drawings discloses a cross-sectional view of the cutter assembly transmission 37 showing the details of construction thereof. The cutter assembly transmission 37 is comprised of a frame member 41 having means for mounting therein pivot mount 38 which is utilized to pivotly mount the rotary cutter assembly 27. Also fixedly mounted to the frame member 41 is shaft mounting member 42 which has journaled therein shaft 43 which has journaled on one end thereof pulley 36. Contained within the shaft 43 is splined bushing 44 which is adapted to slidingly receive splined shaft 45 which has one end thereof fixedly journaled in gear 47 which is in turn journaled by bearings 48 in cutter mounting frame 49. The gear 47 is engaged with a second drive gear 50 which in turn drives cutter gear 51 which is affixed to one end of the shaft about which the rotary cutting element 31 rotates to thereby provide a means for driving the rotary cutting element 31 via pulley 36 which is in turn driven by motor 28.

The cutter mounting frame 49 is adapted to be slidingly displaced along the shaft 52 which has each of its ends fixedly attached to the frame member 41. The sliding movement of the cutter frame 49 along the shaft 52 is caused by air cylinder 53 which has its barrel fixedly attached to the frame member 41 and its rod end affixed to the cutter mounting frame 49 thereby providing a means for imparting linear motion to the cutter mounting frame 49.

It may now be appreciated that there is provided a means for linearly moving the rotary cutting element 31 in order to introduce it to a ply stabilizer ply means in order to allow the rotary cutting element 31 to trim the stabilizer ply means.

Figure 7:
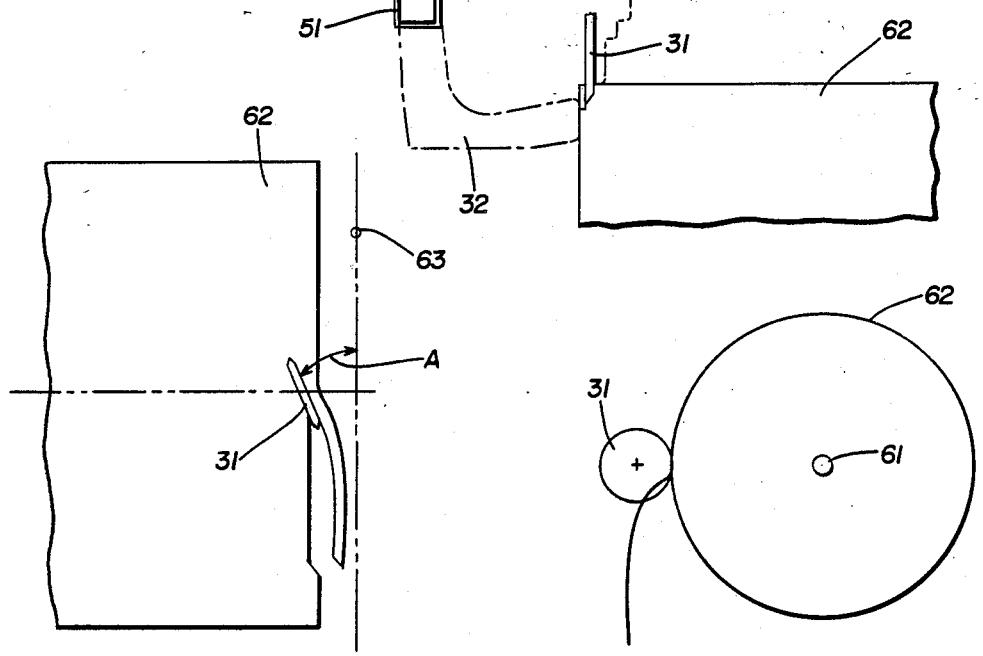
FIG. 7 is a schematic diagram disclosing the relationship between the cutting element of the rotary cutter and the material of the stabilizer ply.

Referring now to FIG. 7 of the drawings, there is disclosed a schematic representation of the rotary cutting element 31 and its positional relationship with the tire building drum 61 to which has been applied stabilizer ply member 62. A reference line 63 is provided to more clearly disclose the angular relationship of the rotary cutting element 31 with respect to the edge of the stabilizer ply member 62.

Specifically, the reference line 63 is orthogonal to the axis of the tire building drum and is parallel to the theoretical edge of the stabilizer ply member 62. It should be noted that the rotary cutting element 31 is angularly displaced from the reference line 63. In the exemplary embodiment the rotary cutting element 31 is displaced three to five degrees from the reference line 63 in order to provide a uniform cut of the stabilizer ply means 62. Although the three to five degree range is optimal, it has been found that the cutting action is satisfactory when the angle A is greater than zero and less than ten degrees.

The angular orientation of the rotary cutting element 31 with respect to the edge of the stabilizer ply means 62 enables the rotary cutting element 31 to more aggressively engage the stabilizer ply means in order to eliminate the hump produced by conventional trimming means. Due to the flexible nature of the edge of the stabilizer ply means during the initial plunge of the rotary trimmer into the stabilizer material, the stabilizer ply material is slightly deflected thereby preventing the rotary cutting element from properly cutting the stabilizer ply material. This normally results in a slight hump at the position where the rotary cutting element is introduced into the stabilizer ply member. The angular relationship of the rotary cutting element 31 with respect to the edge of the stabilizer ply means 62 eliminates this problem by allowing the rotary cutting element 31 to more readily engage the edge of the stabilizer ply means 62 to thereby reduce the hump. Since the angular orientation allows the cutting of thinner pieces from the ply member, any small hump that is produced is cut off during the latter part of the trimming operation.

The angular orientation of the rotary cutting element 31 also assists in the removal of the salvage from the stabilizer ply means 62. Due to the tacky nature of the stabilizer ply material, there is a tendency for the cut salvage of the stabilizer ply material to re-attach itself to the edge from which it was cut after passing around the knife of a conventional rotary cutter. In the conventional situation where the rotary trimmer is utilized in conjunction with a manual tire assembly machine, the re-attachment of the cut salvage to the stabilizer ply assembly is eliminated by having the operator manually pull the cut salvage from the stabilizer ply assembly after it has been cut by the rotary trimmer. However, this means for salvage removal is totally unsuitable for use in connection with an automated tire assembly system.

Figure 8:
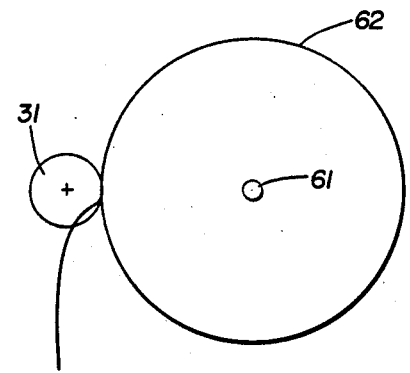
FIG. 8 is a side view of the schematic of the rotary cutter and stabilizer ply shown in FIG. 7.

The instant invention eliminates this problem by causing the cut salvage to be angled away from the edge of the stabilizer ply means 62 as a result of the angular orientation of the rotary cutting element 31 with respect to the edge of the stabilizer ply member 62. In addition, the cut salvage is also displaced away from the ply member due to the rotation of the cutting element 31 as shown in FIG. 8. This advantage is realized because the angled cutter blade acts as a plow to displace the salvage axially away from the tacky, freshly trimmed edge. This plowing action also increases the force and/or adhesiveness of the salvage relative to the spinning cutter blade. Hence, the blade carries the salvage further around its circumference resulting in the salvage dropping free at a point on a larger diameter than the trimmed edge. These two characteristics net a salvage "free-fall" position that eliminates the "salvage stick to cut edge problem" and permits automatic salvage removal by using a compact conveying system. The cut salvage is then allowed to drop to upper salvage conveyor 26 disposed below the rotary cutting element 31 in order to transport the cut salvage away from the edge of the stabilizer ply means 62 to a waste receptacle.

A still further advantage afforded by the angular relationship of the rotary cutting element with respect to the edge of the stabilizer ply means is the ability of the instant invention to cut a much thinner piece of salvage from the edge of the stabilizer ply means thereby reducing the amount of excess stabilizer ply means that must be produced in order to allow a trimming operation of the stabilizer ply means. The ability of the instant invention to cut a thinner piece of salvage from the stabilizer ply means is a result of the angular relationship of the rotary cutting element 31 with respect to the edge of the stabilizer ply means which allows the cutting element 31 to more readily cut the stabilizer ply means.

Although the instant invention has been described in connection with the trimming of a stabilizer ply material, it should be appreciated that the instant invention may be employed to cut a wide variety of materials and that the materials so produced may be used in a wide variety of applications.

It will be apparent to those skilled in the art that various modifications and additions may be made in the instant invention without departing from the essential features thereof, which are intended to be defined and secured by the appended claims.

What is claimed is:

1. In an apparatus for trimming a stabilizer ply disposed on a tire building drum using a rotary cutting element having a sharpened edge for coacting with a fixed surface to form a cutting apparatus, the improvement comprising means for varying the angular relationship of the axis of the cutting edge of said rotary cutting element with respect to the axis of said tire building drum.

* * * * *